(12) United States Patent
Cooper et al.

(10) Patent No.: US 11,588,661 B2
(45) Date of Patent: Feb. 21, 2023

(54) BATTERY MANAGEMENT SYSTEM WITH DUAL CAN MESSAGING

(71) Applicant: Green Cubes Technology, LLC, Kokomo, IN (US)

(72) Inventors: Anthony Cooper, Kokomo, IN (US); Raghuram Devanur Chandrashekhariah, Kokomo, IN (US); Scott Hullinger, Kokomo, IN (US)

(73) Assignee: Green Cubes Technology, LLC, Kokomo, IN (US)

( * ) Notice: Subject to any disclaimer, the term of this patent is extended or adjusted under 35 U.S.C. 154(b) by 136 days.

(21) Appl. No.: 17/030,292

(22) Filed: Sep. 23, 2020

(65) Prior Publication Data

US 2021/0213851 A1 Jul. 15, 2021

Related U.S. Application Data

(60) Provisional application No. 62/904,032, filed on Sep. 23, 2019.

(51) Int. Cl.
*H04L 12/40* (2006.01)
*B60L 53/66* (2019.01)
*B60L 58/12* (2019.01)
*B60L 53/30* (2019.01)

(52) U.S. Cl.
CPC ............ *H04L 12/40* (2013.01); *B60L 53/305* (2019.02); *B60L 53/66* (2019.02); *B60L 58/12* (2019.02); *H04L 2012/40215* (2013.01)

(58) Field of Classification Search
CPC .......... H04L 12/40; B60L 53/66; B60L 58/12; B60L 53/305
See application file for complete search history.

(56) References Cited

U.S. PATENT DOCUMENTS 9,496,730 B2 * 11/2016 Gallegos ................. B60L 50/40
2012/0105001 A1 * 5/2012 Gallegos ............... H02J 7/0027
320/109

(Continued)

FOREIGN PATENT DOCUMENTS

CN 104199298 A 8/2014

OTHER PUBLICATIONS

Patent Cooperation Treaty (PCT), International Searching Authority, International Search Report, PCT/US2020/052330, dated Jan. 27, 2021.

(Continued)

*Primary Examiner* — Henry Tsai
*Assistant Examiner* — Christopher A Daley
(74) *Attorney, Agent, or Firm* — Reichel Stohry Dean LLP; Mark C. Reichel; Natalie J. Dean (57) ABSTRACT

Battery management systems with dual CAN messaging. In at least one embodiment of a battery management system (BMS) of the present disclosure, the BMS comprises at least two, dual, controller area network (CAN) transceivers, wherein a first CAN transceiver is for a vehicle bus and a second CAN transceiver is for a charger bus, and a computer program operable to communicate with the two, dual, CAN transceivers to toggle back and forth between vehicle intended, and charger intended, messaging states to improve battery operating efficiency.

20 Claims, 8 Drawing Sheets

(56) References Cited

U.S. PATENT DOCUMENTS

| | | | |
|---|---|---|---|
| 2013/0175976 A1* | 7/2013 | Rana | H02J 7/00302 320/107 |
| 2013/0221919 A1* | 8/2013 | Gallegos | B60L 58/16 320/109 |
| 2015/0095711 A1* | 4/2015 | Elend | G06F 11/261 714/39 |
| 2015/0373158 A1* | 12/2015 | Kim | H04L 12/40189 709/223 |
| 2016/0288744 A1* | 10/2016 | Rutherford | B60L 1/00 |
| 2017/0005371 A1 | 1/2017 | Chidester et al. | |
| 2019/0067961 A1* | 2/2019 | King | H02J 7/0045 |

OTHER PUBLICATIONS

Patent Cooperation Treaty (PCT), International Searching Authority, Written Opinion of the International Searching Authority, PCT/US2020/052330, dated Jan. 27, 2021.

\* cited by examiner

BATTERY MANAGEMENT SYSTEM WITH DUAL CAN MESSAGING

PRIORITY

The present application is related to, and claims the priority benefit of, U.S. Provisional Patent Application Ser. No. 62/904,032, filed Sep. 23, 2019, the contents of which are incorporated herein directly and by reference in their entirety.

BACKGROUND

Within vehicle battery management systems, end customers want a battery that has a CAN (Controller Area Network) bus capable of communicating with both the vehicle system and the battery system quickly and efficiently. In order to accomplish this and send CAN messages only in an intended state (i.e., either charger or vehicle), a dedicated CAN transceiver will need to be added to the integrated circuit (IC) on the BMS printed circuit board (PCB) for each bus and a mechanism in the battery management system (BMS) software will toggle the messaging to occur only when in the expected state. Only two CAN transceivers may be used; a first CAN transceiver can be used for a vehicle bus and a second CAN transceiver may be used for the charger bus. The use of two (i.e., dual) transceivers on the PCB or IC of the BMS along with its accompanying software, will allow CAN messages to be transmitted to and from the vehicle bus and charger bus quickly and efficiently, resulting in improved battery charging capability and performance.

Additionally, the use of two (i.e., dual) transceivers on the PCB of the BMS along with its accompanying software, will provide the BMS with improved ability to determine baud rate settings automatically. Currently, CAN messages intended for both the battery charger and vehicle bus are sent at the same time, at the same baud rate, by one CAN transceiver, regardless of the device's state, making it difficult for the vehicle and charger bus to communicate quickly and efficiently and resulting in poor battery performance. The use of two CAN transceivers will eliminate the need for the BMS to modify/translate the CAN messages and/or come up with a common baud rate. Additionally, some customers do not want the BMS to send CAN messages intended for the battery charger on the vehicle bus (and at a different baud rates). Thus, the use of two (i.e., dual) transceivers on the PCB of the BMS along with its accompanying software, to more efficiently communicate with the battery charger CAN bus and vehicle CAN bus, will provide a competitive advantage for serving customers.

While CAN messaging for a charger interface and a vehicle interface is possible with only 1 transceiver on the BMS PCB (and currently, it is typical to use only 1 transceiver on a BMS PCB), it is not optimal or efficient for certain vehicle-battery applications, and thus would not have been an obvious improvement. Adding another (second) CAN transceiver to a PCB of a BMS consumes a lot of overhead in terms of circuit board, software, and firmware design, testing, and integration, and thus, has not historically been done/implemented. For example, in order to implement the second CAN transceiver on the PCB, other features of the PCB, such as the power supply components/circuits, microcontroller I/O, firmware and software, all needed to be redesigned. Furthermore, it would not have been obvious to one of ordinary skill in the art to simply add a second CAN transceiver, because until very recently, battery chargers were not even CAN bus capable, and because it is very uncommon (in the motive power industry) to have a BMS utilize two CAN buses.

BRIEF SUMMARY

In at least one embodiment of a battery management system (BMS) of the present disclosure, the BMS comprises at least two, dual, controller area network (CAN) transceivers, wherein a first CAN transceiver is for a vehicle bus and a second CAN transceiver is for a charger bus, and a computer program operable to communicate with the two, dual, CAN transceivers to toggle back and forth between vehicle intended, and charger intended, messaging states to improve battery operating efficiency.

In at least one embodiment of a battery management system (BMS) of the present disclosure, the computer program further controls baud rates.

In at least one embodiment of a battery management system (BMS) of the present disclosure, the BMS improves battery operating efficiency of a vehicular lithium battery.

In at least one embodiment of a battery management system (BMS) of the present disclosure, the at least two, dual, controller area network (CAN) transceivers are positioned on a printed circuit board (PCB).

In at least one embodiment of a battery management system (BMS) of the present disclosure, the at least two, dual, controller area network (CAN) transceivers are positioned on an integrated circuit (IC).

In at least one embodiment of a battery management system (BMS) of the present disclosure, the BMS further comprises a processor and storage medium in operable communication with the computer program and the at least two, dual, controller area network (CAN) transceivers.

In at least one embodiment of a battery management system (BMS) of the present disclosure, the at least two, dual, controller area network (CAN) transceivers are in direct communication with the processor and storage medium.

In at least one embodiment of a battery management system (BMS) of the present disclosure, the at least two, dual, controller area network (CAN) transceivers are in indirect communication with the processor and storage medium.

In at least one embodiment of a battery management system (BMS) of the present disclosure, the at least two, dual, controller area network (CAN) transceivers comprise typical MAX13054ESA+ transceivers.

In at least one embodiment of a method of operating a battery management system (BMS) of a battery in communication with at least two, dual, controller area network (CAN) transceivers, wherein a first CAN transceiver is for a vehicle bus and a second CAN transceiver is for a charger bus, of the present disclosure, the method comprises sensing a battery input, comparing the sensed battery input to predetermined threshold levels within the BMS, determining if the battery is in a charge state or a discharge state, and switching between the at least two, dual, CAN transceivers to transmit vehicle intended messages, or charger intended messages, to improve battery operating efficiency.

In at least one embodiment of a method of operating a battery management system (BMS) of a battery in communication with at least two, dual, controller area network (CAN) transceivers, wherein a first CAN transceiver is for a vehicle bus and a second CAN transceiver is for a charger bus, of the present disclosure, the method further comprises determining that the battery is not being charged and is in the discharge state, and continuing to transmit vehicle intended controller area network (CAN) messages to the battery while the battery remains in the discharge state.

In at least one embodiment of a method of operating a battery management system (BMS) of a battery in communication with at least two, dual, controller area network (CAN) transceivers, wherein a first CAN transceiver is for a vehicle bus and a second CAN transceiver is for a charger bus, of the present disclosure, the method further comprises determining that the battery is being charged and is in the charge state, and then switching to transmitting charger intended controller area network (CAN) messages while the battery is in the charge state.

In at least one embodiment of a method of operating a battery management system (BMS) of a battery in communication with at least two, dual, controller area network (CAN) transceivers, wherein a first CAN transceiver is for a vehicle bus and a second CAN transceiver is for a charger bus, of the present disclosure, switching further comprises toggling back and forth toggle back between vehicle intended, and charger intended, messaging states to improve overall battery operating efficiency.

In at least one embodiment of a method of operating a battery management system (BMS) of a battery in communication with at least two, dual, controller area network (CAN) transceivers, wherein a first CAN transceiver is for a vehicle bus and a second CAN transceiver is for a charger bus, of the present disclosure, the method further comprises programming or optimizing baud rates of the BMS.

In at least one embodiment of a method of operating a battery management system (BMS) of a battery in communication with at least two, dual, controller area network (CAN) transceivers, wherein a first CAN transceiver is for a vehicle bus and a second CAN transceiver is for a charger bus, of the present disclosure, the method comprises sensing a battery input to ensure the battery is not being charged and is still being discharged by a vehicle in operation; and continuing to transmit vehicle intended CAN messages as long as the battery remains in a discharge state, to improve battery operating efficiency.

In at least one embodiment of a method of operating a battery management system (BMS) of a battery in communication with at least two, dual, controller area network (CAN) transceivers, wherein a first CAN transceiver is for a vehicle bus and a second CAN transceiver is for a charger bus, of the present disclosure, the method further comprises determining that the battery is being charged and is in a charge state, and then switching to transmitting charger intended controller area network (CAN) messages while the battery is in the charge state.

In at least one embodiment of a method of operating a battery management system (BMS) of a battery in communication with at least two, dual, controller area network (CAN) transceivers, wherein a first CAN transceiver is for a vehicle bus and a second CAN transceiver is for a charger bus, of the present disclosure, the method further comprises toggling back and forth toggle back between vehicle intended, and charger intended, messaging states to improve battery operating efficiency.

In at least one embodiment of a method of operating a battery management system (BMS) of a battery in communication with at least two, dual, controller area network (CAN) transceivers, wherein a first CAN transceiver is for a vehicle bus and a second CAN transceiver is for a charger bus, of the present disclosure, the method further comprises comparing the sensed battery input to predetermined threshold levels within the BMS.

In at least one embodiment of a method of operating a battery management system (BMS) of a battery in communication with at least two, dual, controller area network (CAN) transceivers, wherein a first CAN transceiver is for a vehicle bus and a second CAN transceiver is for a charger bus, of the present disclosure, the method further comprises verifying that controller area network (CAN) messages are appropriately sent by the BMS.

In at least one embodiment of a method of operating a battery management system (BMS) of a battery in communication with at least two, dual, controller area network (CAN) transceivers, wherein a first CAN transceiver is for a vehicle bus and a second CAN transceiver is for a charger bus, of the present disclosure, the method further comprises verifying that controller area network (CAN) messages are appropriately sent by the BMS by connecting devices transmitting at different baud rates to verify that the BMS adjusts baud rates appropriately.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein.

As such, an overview of the features, functions and/or configurations of the components depicted in the various figures will now be presented. It should be appreciated that not all of the features of the components of the figures are necessarily described and some of these non-discussed features (as well as discussed features) are inherent from the figures themselves. Other non-discussed features may be inherent in component geometry and/or configuration. Furthermore, wherever feasible and convenient, like reference numerals are used in the figures and the description to refer to the same or like parts or steps. The figures are in a simplified form and not to precise scale.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The present disclosure includes various lithium battery management systems (BMS) having two (i.e., dual) transceivers on the PCB or IC of the BMS along with accompanying software, to allow CAN messages to be transmitted to and from the vehicle bus and charger bus quickly and efficiently. To send CAN messages only in the intended state (i.e., charger or vehicle), the BMS software will toggle the messaging to occur only when in the intended state. A first transceiver may be used for a vehicle bus and a second CAN transceiver may be used for the charger bus to improve BMS efficiency in certain battery charger-vehicle operations.

Figure 1:
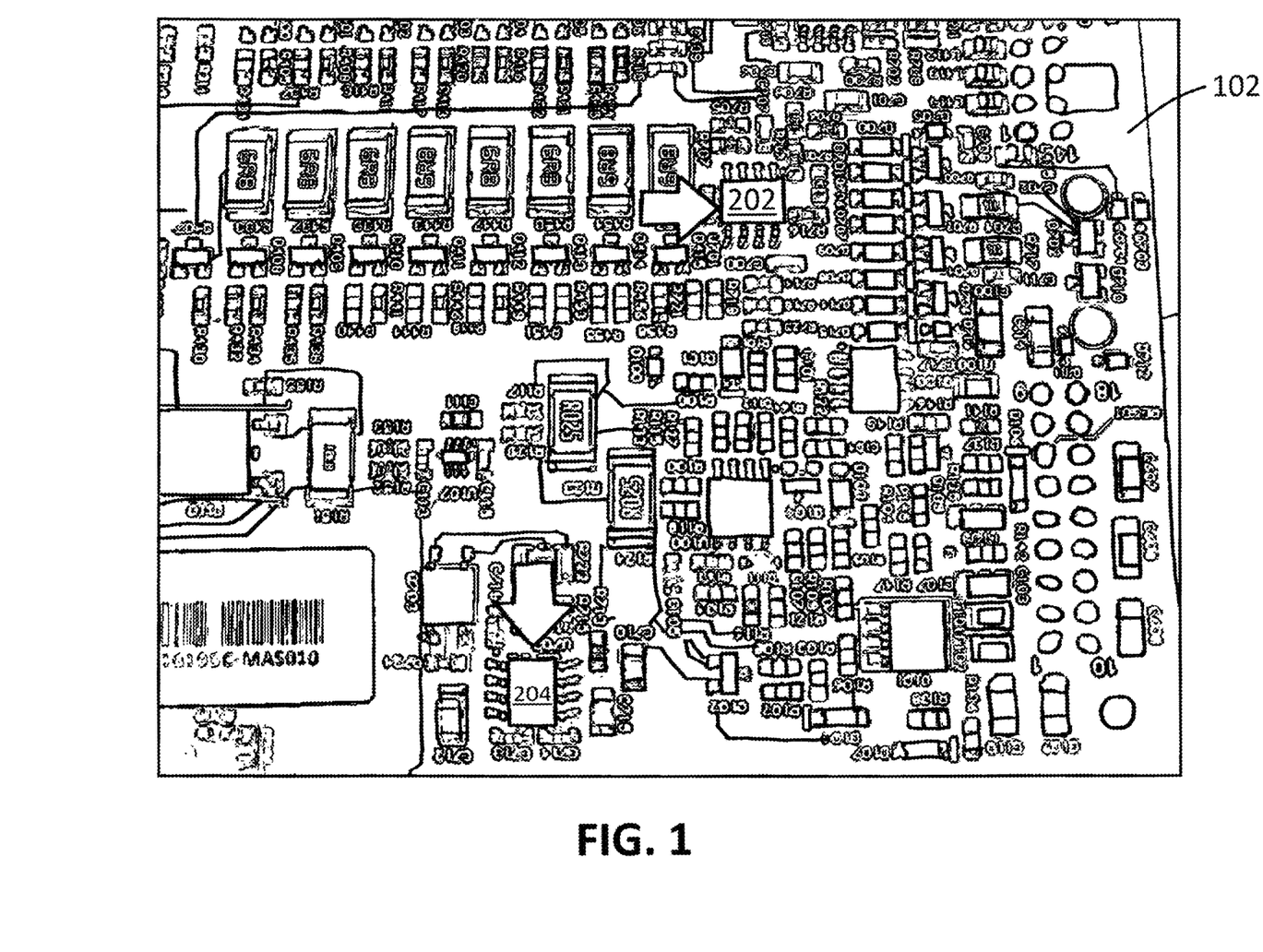
FIG. 1 illustrates an exemplary printed circuit board (PCB) having two/dual CAN transceivers thereon.
Figure 2A:
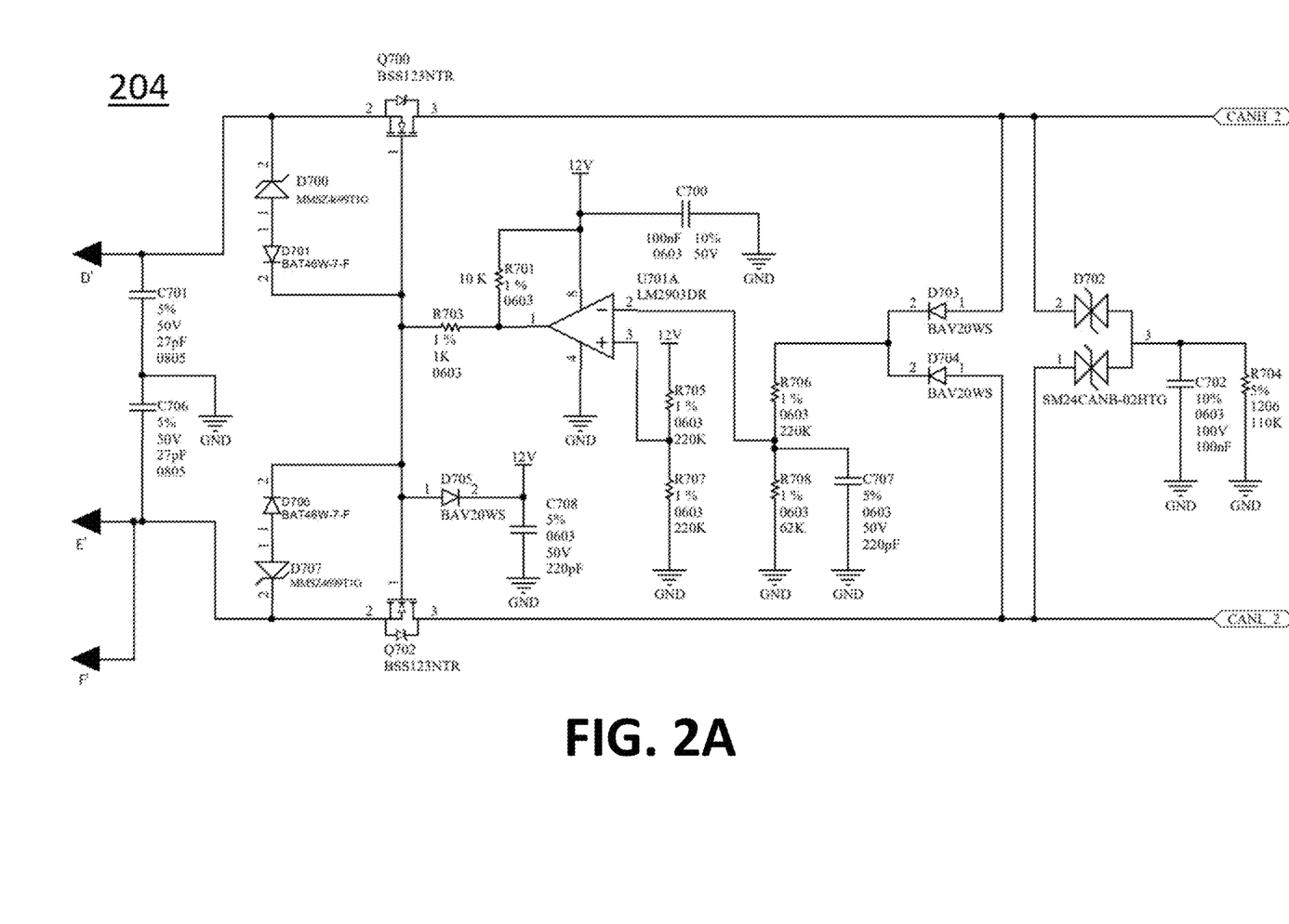
FIG. 2A illustrates a right-side portion of the electrical schematic drawing of the second CAN transceiver.
Figure 2B:
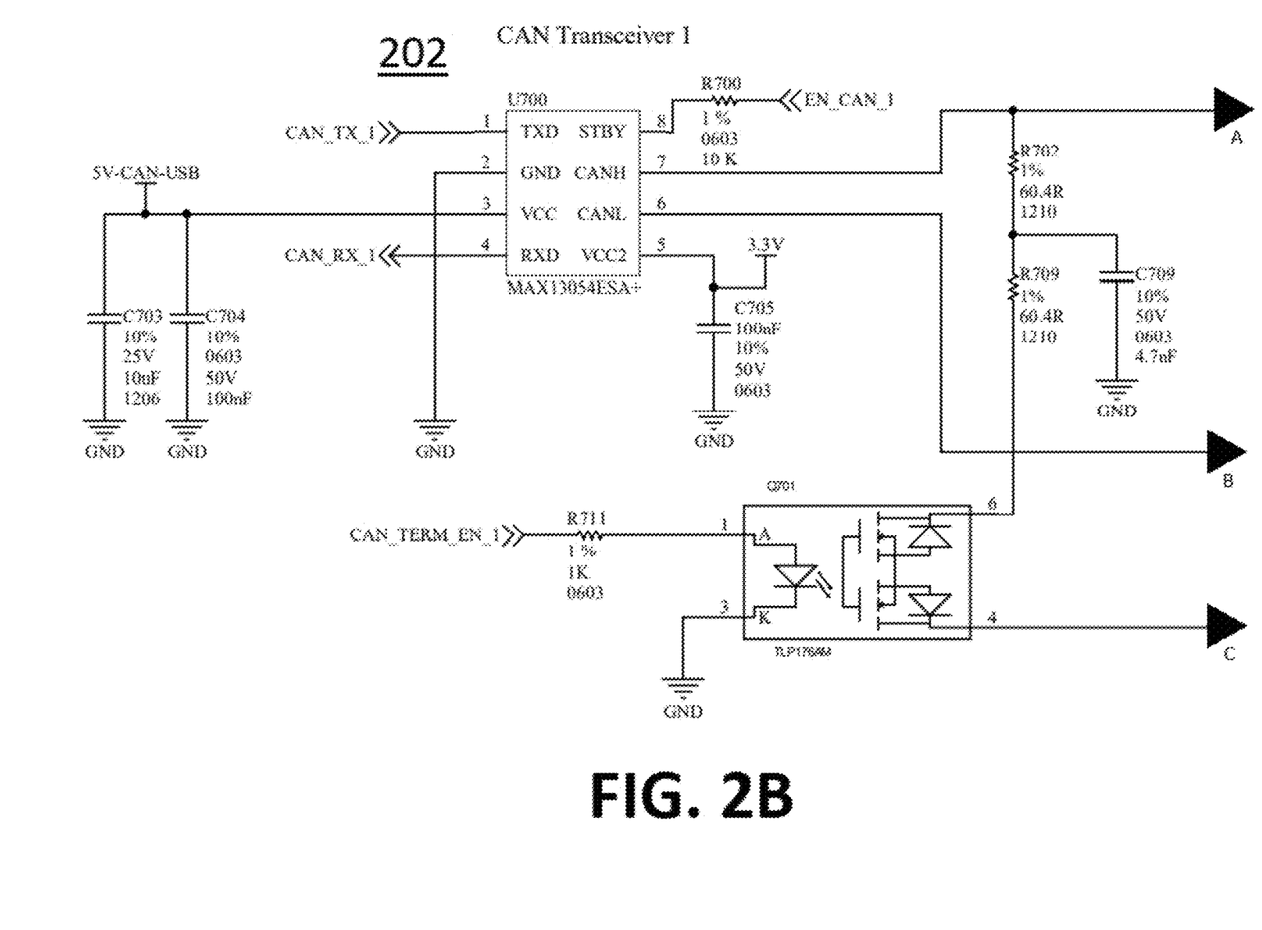
FIG. 2B illustrates a left-side portion of the electrical schematic drawing of the first CAN transceiver.
Figure 2C:
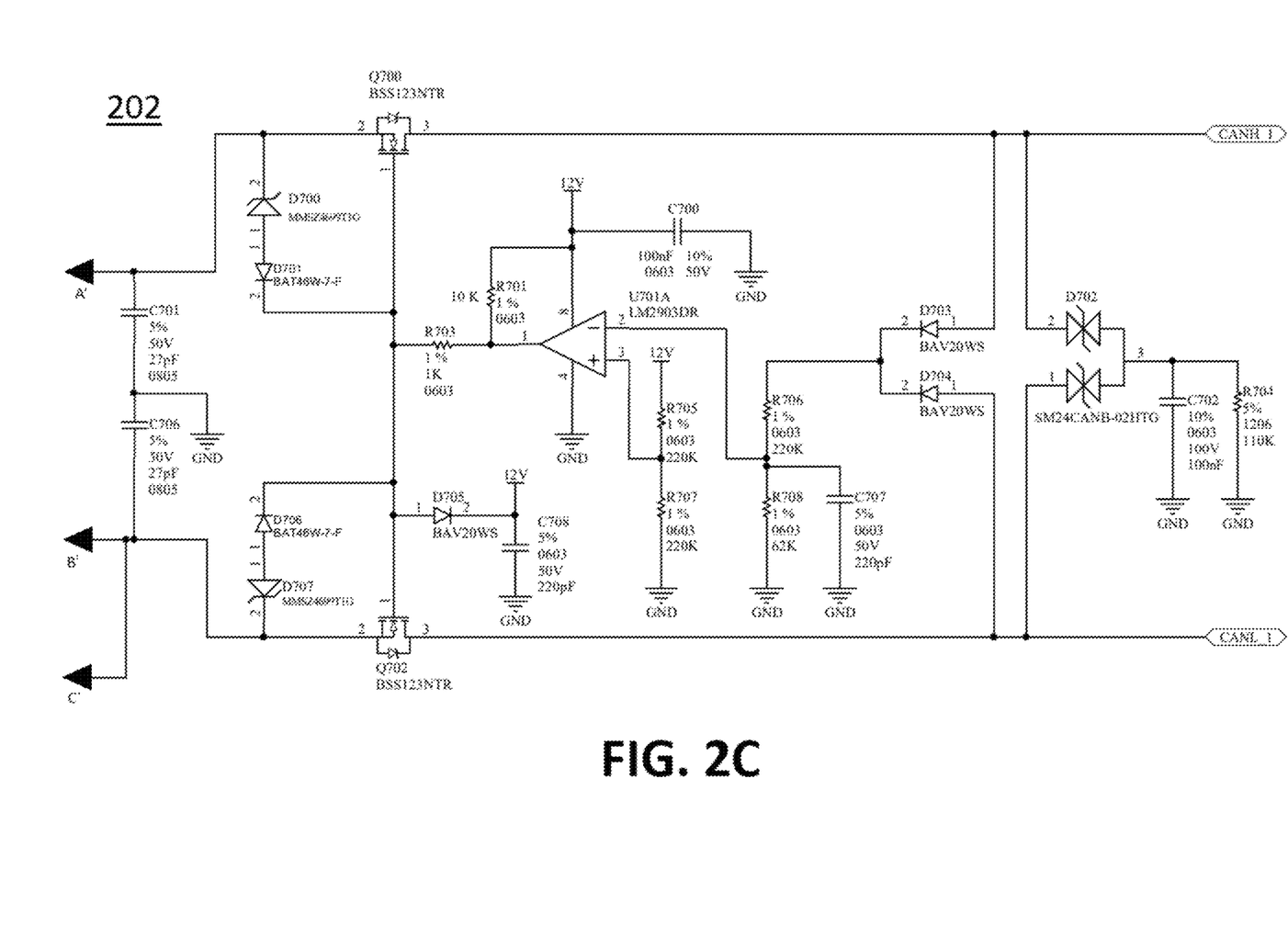
FIG. 2C illustrates a right-side portion of the electrical schematic drawing of the first CAN transceiver.
Figure 2D:
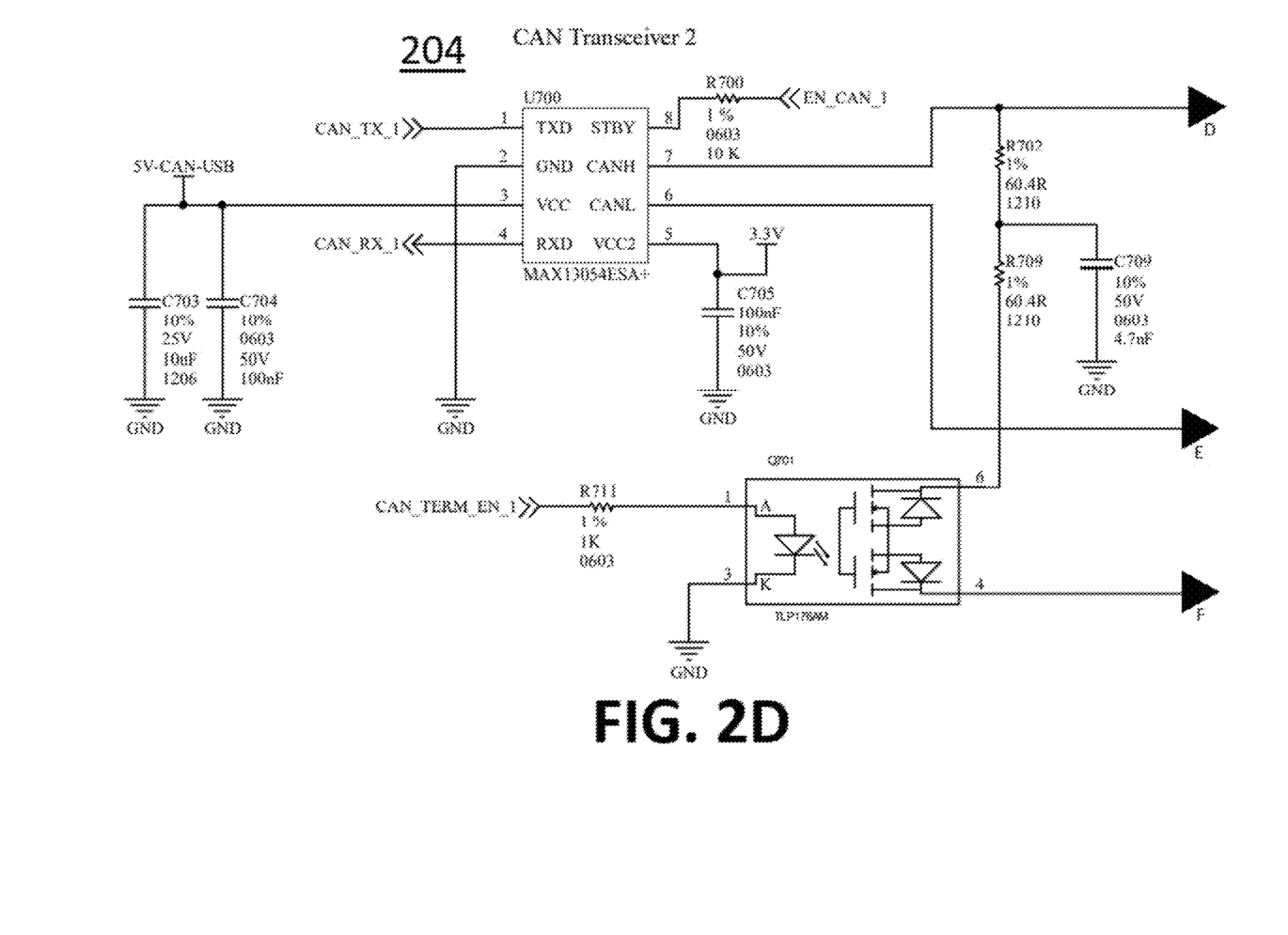
FIG. 2D illustrates a left-side portion of the electrical schematic drawing of the second CAN transceiver.

A lithium battery, such as a forklift or other vehicle battery may include a BMS having 2 (i.e., dual) CAN transceivers on the PCB. In a first embodiment, as shown in FIG. 1, a PCB 102 within a vehicle BMS has 2 CAN transceivers 202, 204 (shown with large arrows) thereon. The 2 CAN transceivers 202, 204 may be typical CAN transceivers, such as MAX13054ESA+, made by Maxim Integrated, for example. It should be understood that the advantageous use of 2 CAN transceivers 202, 204, as described herein, may be applied to/used on various different types of batteries, ICs, and PCB's within those batteries and their BMS's and are not limited to only vehicle batteries.

Figure 3:
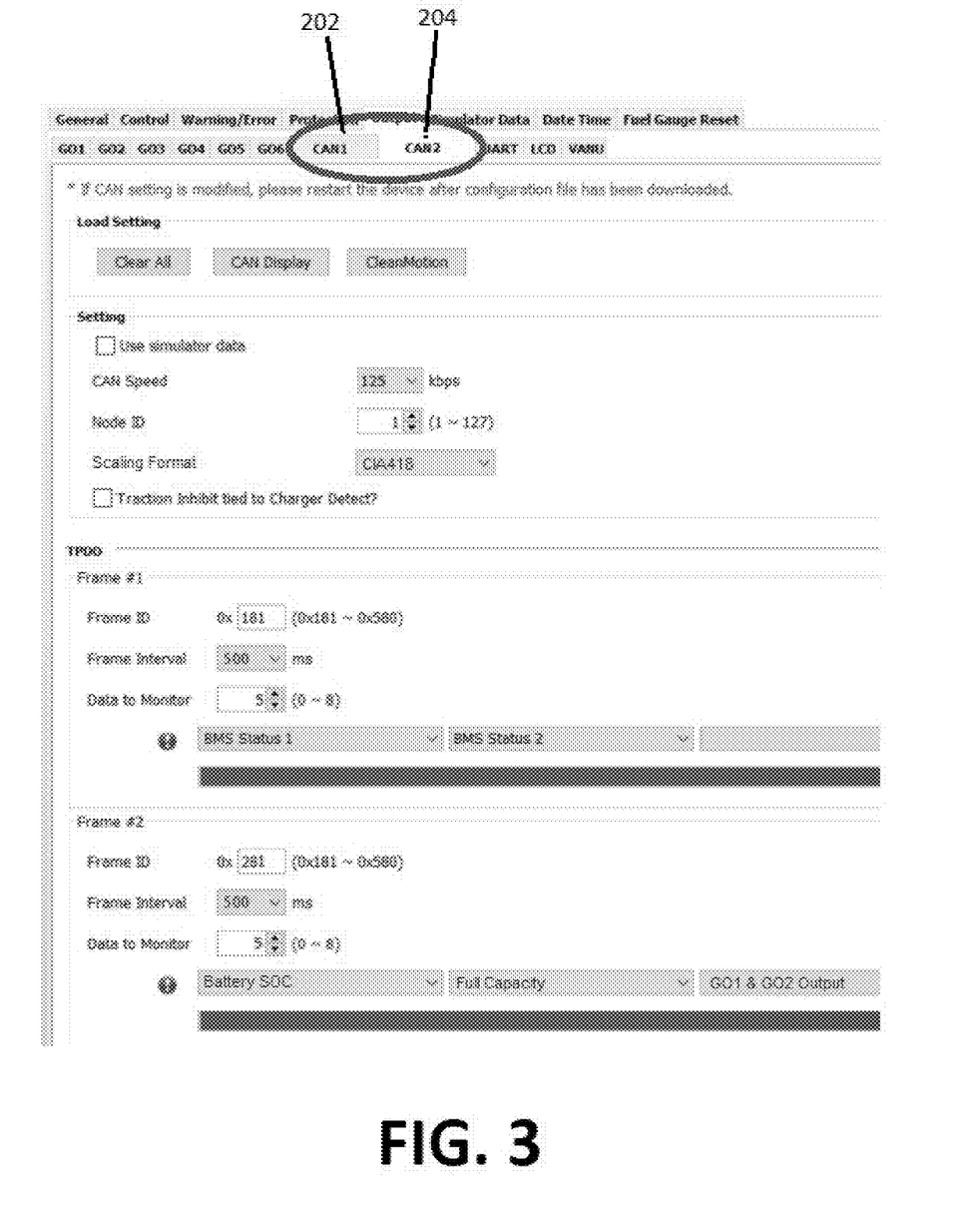
FIG. 3 illustrates an exemplary screen shot showing the interface software for two/dual CAN transceivers for software programming operations.

FIGS. 2A, 2B, 2C, and 2D illustrate exemplary electrical schematics of the 1$^{st}$ CAN transceiver 202 and the 2$^{nd}$ CAN transceiver 204. The use of 2 CAN transceivers 202, 204 (i.e., for vehicle and charger) may be accompanied by specialized BMS software to control the intended message state (i.e., vehicle or charger) and baud rates, etc. FIG. 3 illustrates an exemplary screen shot of BMS interface software for two/dual CAN transceivers 202, 204 for software programming operations.

The BMS software will have the configurable option of defining the intended state (i.e., vehicle or charger), if any, of the device when the messages will be exclusively sent. The device will be placed in and out of the intended state (i.e., vehicle or charger) and then the CAN bus(es) will be monitored to verify that the CAN messages are appropriately sent by the BMS. Another method of verification may be to connect devices transmitting at different baud rates and then verify that the BMS adjusts the baud rate appropriately/accordingly.

Figure 4:
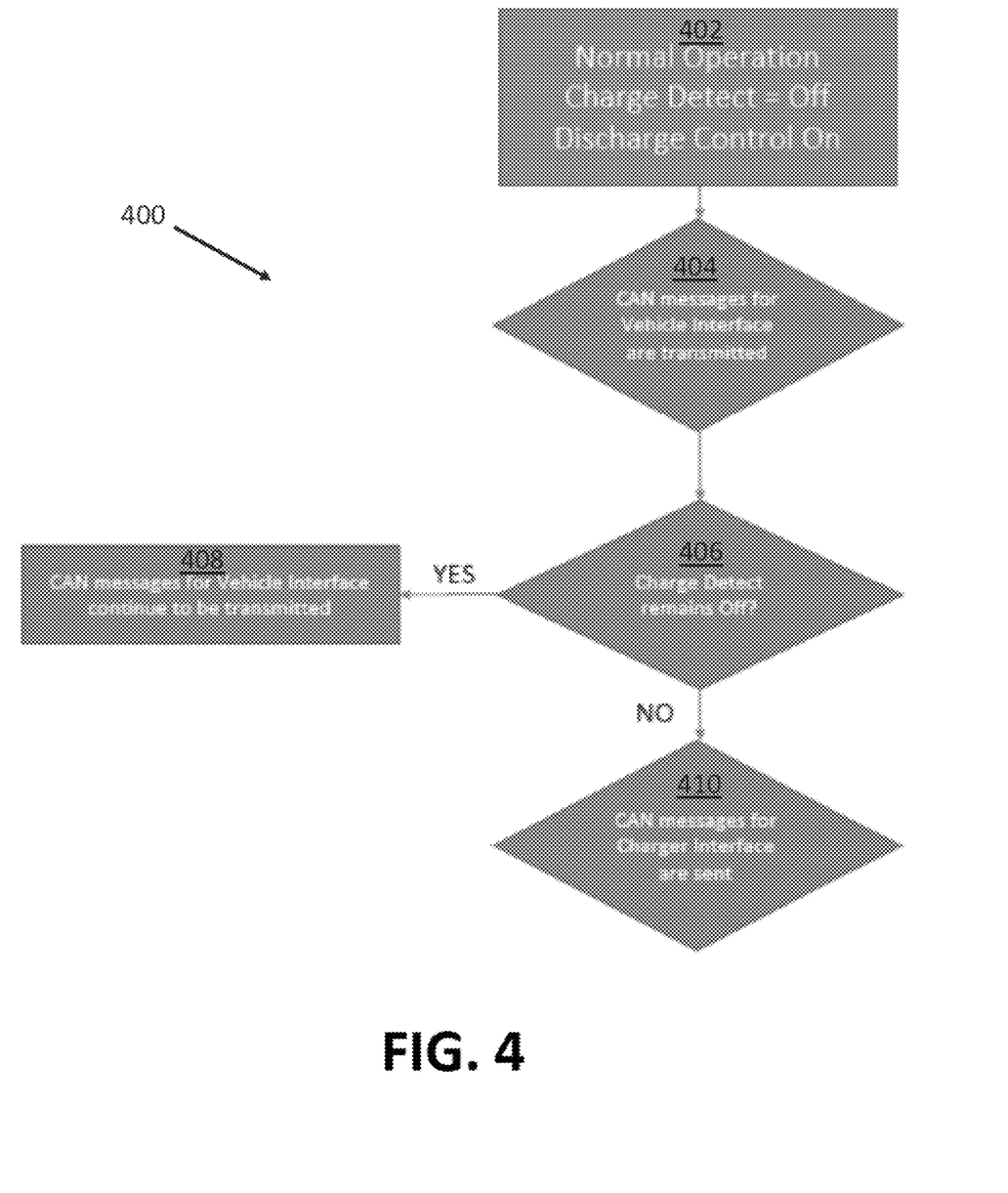
FIG. 4 illustrates a flow diagram showing exemplary operation of the charge detect and discharge control states of a battery BMS.

FIG. 4 is a flowchart illustrating the operation 400 of the BMS software in combination with the use of two CAN transceivers (i.e., one transceiver for vehicle bus and one transceiver for charger bus). The BMS operates 400 by sensing input and then switching between battery charge and discharge states 402, depending upon predetermined thresholds within the BMS software. In normal BMS operation (shown in box 402), the BMS senses that the battery is not currently being charged (i.e., the "battery charge detect=off") and the battery discharge control in on (i.e., the battery is currently being used/discharged, such as by a forklift vehicle in use), as shown in box 402. When the battery is being used/discharged, such as by a forklift or other vehicle, the CAN messages for the vehicle interface (not the charger interface) are being transmitted 404. As long at the BMS senses that the battery is not being charged (i.e., charge detect remains off) 406, then CAN messages for the vehicle interface continue to be transmitted 408. However, if the BMS senses that the battery is being charged (i.e., charge detect is turned on), then the CAN messages for the charger interface are sent 410. In this manner, the BMS software toggles back and forth between the vehicle and charger interfaces to optimize the battery charging efficiency.

Figure 5:
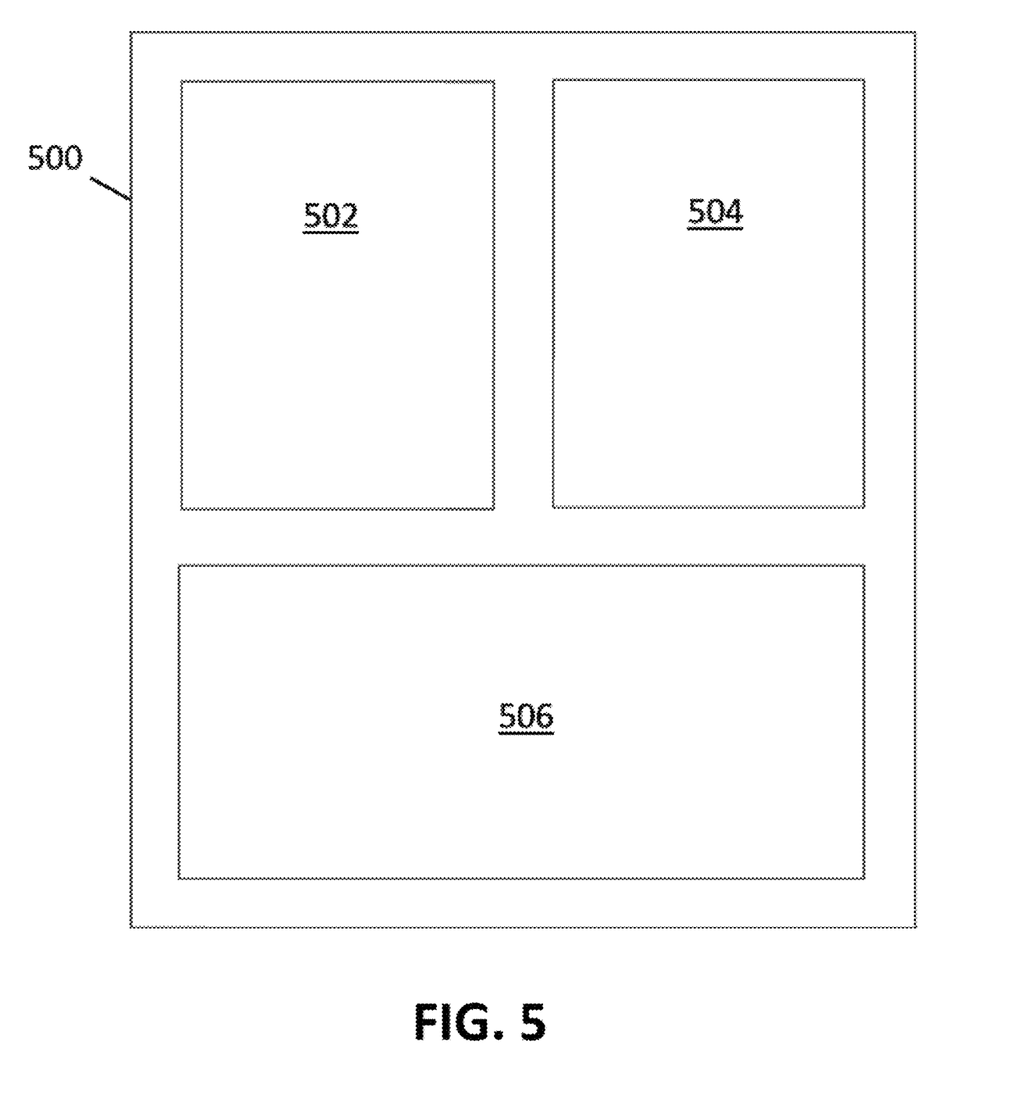
FIG. 5 illustrates a block diagram of an exemplary computer for operation of the BMS software and/or first and second CAN transceivers.

As shown in FIG. 5, the BMS computer program, instructions, or software, 506 may be operated via a computer 500, the computer 500 being any number of traditional computer/computational devices, having at least one processor 502 in communication with a storage medium 504, the storage medium 504 configured to store instructions (i.e., computer programs and/or software) thereon, and the processor 502 configured to access said instructions and control the operation of said instructions in connection with the operation of other aspects of the computer 500, peripheral devices, and/or other items in communication with said processor 502. The BMS software 506 and 2 CAN transceivers 202, 204 may be a part of the IC and/or PCB and/or may also comprise a portion of the computer 500, whereby the BMS software 506 and 2 CAN transceivers 202, 204 may be in direct or indirect communication with the storage medium 504 or processor 502, as shown in FIG. 5.

While various embodiments of devices and systems and methods for using the same have been described in considerable detail herein, the embodiments are merely offered as non-limiting examples of the disclosure described herein. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A battery management system (BMS), comprising:
   at least two, dual, controller area network (CAN) transceivers, wherein a first CAN transceiver is configured to transmit messages to a vehicle bus and a second CAN transceiver is configured to transmit messages to a charger bus, wherein the vehicle bus and the charger bus are each individual CAN buses; and
   a computer program operable to communicate with the two, dual, CAN transceivers to toggle back and forth between vehicle intended, and charger intended, messaging states to improve battery operating efficiency.

2. The BMS of claim 1, wherein the computer program further controls baud rates.

3. The BMS of claim 1, wherein the BMS improves battery operating efficiency of a vehicular lithium battery.

4. The BMS of claim 1, wherein the at least two, dual, CAN transceivers are positioned on a printed circuit board (PCB).

5. The BMS of claim 1, wherein the at least two, dual, CAN transceivers are positioned on an integrated circuit (IC).

6. The BMS of claim 1, further comprising a processor and storage medium in operable communication with the computer program and the at least two, dual, CAN transceivers.

7. The BMS of claim 6, wherein the at least two, dual, CAN transceivers are in direct communication with the processor and storage medium.

8. The BMS of claim 6, wherein the at least two, dual, CAN transceivers are in indirect communication with the processor and storage medium.

9. The BMS of claim 1, wherein the at least two, dual, CAN transceivers comprise typical MAX13054ESA+ transceivers.

10. A method of operating a battery management system (BMS) of a battery in communication with at least two, dual, controller area network (CAN) transceivers, wherein a first CAN transceiver is configured to transmit messages to a vehicle bus and a second CAN transceiver is configured to transmit messages to a charger bus, wherein the vehicle bus and the charger bus are each individual CAN buses, the method comprising:
   sensing a battery input;
   comparing the sensed battery input to predetermined threshold levels within the BMS;
   determining if the battery is in a charge state or a discharge state; and
   switching between the at least two, dual, CAN transceivers to transmit vehicle intended messages, or charger intended messages, to improve battery operating efficiency.

11. The method of claim 10, further comprises determining that the battery is not being charged and is in the discharge state, and continuing to transmit vehicle intended CAN messages to the battery while the battery remains in the discharge state.

12. The method of claim 10, further comprising determining that the battery is being charged and is in the charge state, and then switching to transmitting charger intended CAN messages while the battery is in the charge state.

13. The method of claim 10, wherein switching further comprises toggling back and forth toggle back between vehicle intended, and charger intended, messaging states to improve overall battery operating efficiency.

14. The method of claim 10, further comprising programming or optimizing baud rates of the BMS.

15. A method of operating a battery management system (BMS) of a battery in communication with at least two, dual, controller area network (CAN) transceivers, wherein a first CAN transceiver is configured to transmit messages to a vehicle bus and a second CAN transceiver is configured to transmit messages to a charger bus, wherein the vehicle bus and the charger bus are two individual CAN buses, the method comprising:
   sensing a battery input to ensure the battery is not being charged and is still being discharged by a vehicle in operation; and
   continuing to transmit vehicle intended CAN messages as long as the battery remains in a discharge state, to improve battery operating efficiency.

16. The method of claim 15, further comprising determining that the battery is being charged and is in a charge state, and then switching to transmitting charger intended CAN messages while the battery is in the charge state.

17. The method of claim 15, further comprising toggling back and forth toggle back between vehicle intended, and charger intended, messaging states to improve battery operating efficiency.

18. The method of claim 15, further comprising comparing the sensed battery input to predetermined threshold levels within the BMS.

19. The method of claim 15, further comprising verifying that CAN messages are appropriately sent by the BMS.

20. The method of claim 15, further comprising verifying that CAN messages are appropriately sent by the BMS by connecting devices transmitting at different baud rates to verify that the BMS adjusts baud rates appropriately.

* * * * *